May 8, 1928.
W. UHL
1,668,576
PROCESS AND APPARATUS FOR MANUFACTURING GLASS CORNER STRIPS
Filed July 25, 1927
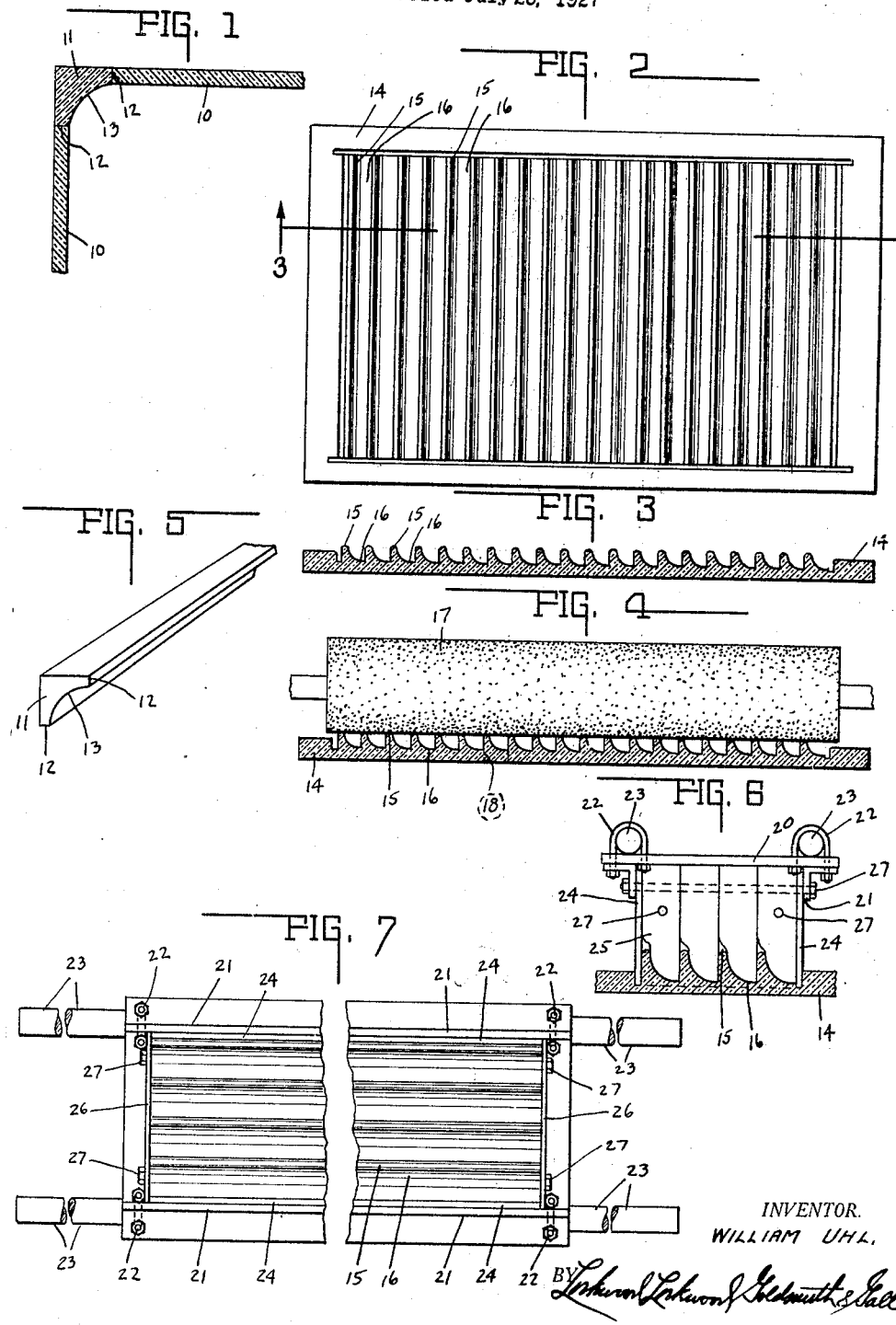
INVENTOR.
WILLIAM UHL.
ATTORNEYS.

Patented May 8, 1928.

1,668,576

UNITED STATES PATENT OFFICE.

WILLIAM UHL, OF INDIANAPOLIS, INDIANA, ASSIGNOR TO MARIETTA MANUFACTURING COMPANY, OF INDIANAPOLIS, INDIANA, A CORPORATION.

PROCESS AND APPARATUS FOR MANUFACTURING GLASS CORNER STRIPS.

Application filed July 25, 1927. Serial No. 208,229.

This invention relates to a new process and apparatus employed therein for the manufacture of corner and base strips of glass for use in connection with glass wainscoting, counter tops and the like.

In the production of glass panels which are used in substitution of marble, slate, tile, etc., for counter tops, table tops, wainscoting and the like, it has heretofore been customary to cut suitable strips and grind the same to produce the desired corner or base piece. Such pieces must necessarily have two edges spaced apart and extending in planes at right angles to each other to abut the adjoining edges of the panels or flooring, the intermediate surface between said edges being ground concave in cross section. The production of such pieces has been exceedingly costly and difficult to manufacture.

It is the object of this invention to form a plurality of such strips from a single sheet of glass by stamping and pressing the same with a die head, grinding off the exposed edge, and thereafter cutting the preformed strips apart.

The full nature of the invention will be understood from the accompanying drawings and the following description and claims.

In the drawings, Figure 1 is a cross sectional view through a pair of panels with the intermediate corner strip. Fig. 2 is a plan view showing the sheet of glass with the corner strips formed therein. Fig. 3 is a section taken on the line 3—3 of Fig. 2. Fig. 4 is a diagrammatic illustration showing the grinding of the exposed edges. Fig. 5 is a perspective view of the finished corner or base strip. Fig. 6 is an end view showing the die head pressed into the glass blank. Fig. 7 is a plan view showing the forming face of the die head.

In the drawings there is shown a pair of panels 10 formed of glass or the like used for wainscoting or similar purposes, there being provided intermediate the adjacent ends thereof in the corner formed therebetween the corner strip 11, such strip being also capable of use as a base strip.

The strip 11 is provided with the spaced surfaces 12 which are formed in planes extending at right angles to each other and abut the adjacent edges of the panels 10. Intermediate the same there is a finished surface 13 concave in cross section.

The process of forming the strips consists in first rolling out a sheet of glass of the material used in the paneling, which is represented in Fig. 2 by "14". The molten glass is rolled to the proper thickness and formed in the usual manner, a die block, as shown in Figs. 6 and 7, and as will be hereinafter more fully described, being applied to the surface by the operators and pressed down into the plastic glass so as to form a plurality of parallel upwardly-extending ridges 15 and depressions 16. The depressions 16 are formed with a concave surface of the same curvature as indicated at 13 in Fig. 1, and of the proper depth to accommodate such curvature.

After the glass has become hardened with the ridges and depressions formed therein, a grinding roller 17 is applied so as to grind off the upper surface of the ridges 15, which extend above the surface of the blank, until a flat finished surface is formed to correspond to one of the surfaces indicated by "12" in Figs. 1 and 5. Such grinding operation is rapidly and accurately performed by reason of the fact that the ridges are all formed of the same size and character and extend in the same plane. By merely passing one grinding roller thereover, the grinding of all the ridges is accomplished in one operation, and the finished surface 12 of all the ridges will be uniform.

After its operation, a cutter is applied between the ridges and the adjacent depression 16, as indicated by the dotted line 18 in Fig. 4, thus separating the strips from each other, each strip comprising a ridge 15 and a depression 16. Upon this cutting operation, the strips will be produced as indicated by "11" in Figs. 1 and 5. However, it may be necessary to finish it by grinding the cut edge which will become one of the finished edges 12 of the completed strip. The strip then upon being cut into proper lengths is ready for use, and it is not necessary to employ the tedious and difficult grinding process for forming the curved surface 13. In this process it is not necessary in any way to finish or treat the surface 13, which will remain untouched from the time of its being originally formed in the glass.

There is shown in Figs. 6 and 7, the die block used for forming the ridges and depressions above described, comprising a plate 20 to which is rigidly secured the angle bars 21 by means of the U-shaped bolts 22. Suitable handles 23 in the form of pipes or the like extend through the U-shaped bolts 22 so as to permit the operator to conveniently handle the head for lifting it on and off of the plastic glass plate and pressing it therein. Clamped between the angle plates 21 there are side plates 24 between which is clamped a plurality of die members 25. There may be any number of such die members and they are removable from the die block so as to permit replacement. The forming surface of each of the members is such as to make the desired impression in the glass, as shown in Figs. 2, 3 and 4. On each end of the die members there are end plates 26, said end plates and side plates being securely clamped in place through the medium of bolts 27.

The invention claimed is:

1. The process of manufacturing corner and base strips of glass consisting of forming a flat blank, pressing in the surface of said blank while in a plastic state a depression having its surface formed of the desired curvature, and thereafter cutting from said blank a portion thereof embracing said depression, and finishing said portion into a corner or base strip.

2. The process of manufacturing corner and base strips of glass consisting of rolling a sheet of glass in a flat blank, applying a die to the surface thereof while in a plastic state and pressing it therein to form a plurality of parallel ridges and depressions, said depressions having the desired concave curvature in cross section of the finished strip, and cutting said glass between the ridges formed thereon and adjacent recesses at the thinnest part thereof, whereby said glass will be formed into a plurality of strips having a surface running longitudinally thereof concave in cross section and of the desired curvature.

3. The process of manufacturing corner and base strips of glass, consisting of forming a sheet of glass in a flat blank, applying a die to the surface thereof while in a plastic state so as to form a plurality of parallel ridges and depressions, said ridges protruding above the normal surface of the glass blank and said depressions having the desired concave curvature in cross section of the finished strip, and cutting said glass between the ridges formed thereon and the adjacent recesses at the thinnest part thereof, whereby said glass will be formed into a plurality of strips having a surface running longitudinally thereof concave in cross section and of the desired curvature.

4. The process of manufacturing corner and base strips of glass consisting of rolling a sheet of glass in a flat blank, applying a die to the surface thereof while in a plastic state so as to form a plurality of parallel ridges and depressions, said ridges protruding above the normal surface of the glass blank and said depressions having the desired concave curvature in cross section of the finished strip, applying a grinding roller to the protruding ridges for grinding the same and providing a flat surface thereon, and cutting said glass between the ridges formed thereon and the adjacent recesses at the thinnest part thereof, whereby said glass will be formed into a plurality of strips having a surface running longitudinally thereof concave in cross section and of the desired curvature.

5. An apparatus for manufacturing corner and base strips of glass, comprising a die block having a base plate, and a plurality of die members secured thereto in parallel relation with each other, each of said die members having one engaging surface thereof extending longitudinally and convex in cross section with the same curvature as the concave surface to be formed on the corner and base strips, said curved surface extending from substantially one engaging edge of the member to a position adjacent and spaced inwardly from the adjacent engaging edge of the next die member for permitting a projecting ridge to be formed therein as a continuation of the curved recess formed in the glass by said member.

6. An apparatus for manufacturing corner and base strips of glass comprising a die block having a plurality of handles protruding therefrom rigidly secured thereto, clamping members secured on said block, and a plurality of dies clamped thereon, said dies being mounted parallel to each other and having one side thereof formed with a convex surface in cross section adapted to be pressed into a plastic sheet of glass to form a plurality of ridges and intermediate depressions, said depressions having the desired curvature of the corner and base strip.

In witness whereof, I have hereunto affixed my signature.

WILLIAM UHL.